United States Patent
Tsuge

(10) Patent No.: US 11,399,249 B2
(45) Date of Patent: Jul. 26, 2022

(54) REPRODUCTION SYSTEM AND REPRODUCTION METHOD

(71) Applicant: YAMAHA CORPORATION, Hamamatsu (JP)

(72) Inventor: Yoshiyuki Tsuge, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 0 days.

(21) Appl. No.: 17/098,857

(22) Filed: Nov. 16, 2020

(65) Prior Publication Data
US 2021/0067890 A1 Mar. 4, 2021

Related U.S. Application Data

(63) Continuation of application No. PCT/JP2019/019466, filed on May 16, 2019.

(30) Foreign Application Priority Data

May 25, 2018 (JP) .............................. JP2018-100186

(51) Int. Cl.
*H04S 3/00* (2006.01)
*G10F 1/08* (2006.01)
(Continued)

(52) U.S. Cl.
CPC ................ *H04S 3/008* (2013.01); *G10F 1/08* (2013.01); *H04R 1/24* (2013.01); *H04R 5/02* (2013.01);
(Continued)

(58) Field of Classification Search
None
See application file for complete search history.

(56) References Cited

U.S. PATENT DOCUMENTS

| 5,315,060 A | 5/1994 | Paroutaud |
| 2003/0123673 A1 | 7/2003 | Kojima |

(Continued)

FOREIGN PATENT DOCUMENTS

| JP | H0621097 U | 3/1994 |
| JP | 2016045316 A | 4/2016 |

(Continued)

OTHER PUBLICATIONS

International Search Report issued in Intl. Appln. No. PCT/JP2019/019466 dated Jul. 30, 2019. English translation provided.

(Continued)

*Primary Examiner* — Qin Zhu
(74) *Attorney, Agent, or Firm* — Rossi, Kimms & McDowell LLP

(57) ABSTRACT

A reproduction system includes an output apparatus that outputs multitrack data including a plurality of track-by-track audio data of sounds of (i) musical instruments, (ii) singing voices, or both (i) and (ii), the plurality of track-by-track audio data including audio data of at least an acoustic instrument, a vibrator that vibrates the acoustic instrument in accordance with the audio data of the acoustic instrument included in the plurality of track-by-track audio data included in the multitrack data, and a speaker that outputs the sounds of (i) the musical instruments, (ii) the singing voices, or both (i) and (ii) in accordance with the plurality of track-by-track audio data.

18 Claims, 16 Drawing Sheets

(51) Int. Cl.
*H04R 1/24* (2006.01)
*H04R 5/02* (2006.01)
*H04N 5/04* (2006.01)
*H04N 9/31* (2006.01)
*H04N 21/414* (2011.01)
*H04N 21/43* (2011.01)
*H04N 21/81* (2011.01)
*H04R 7/04* (2006.01)
*G10H 1/32* (2006.01)

(52) U.S. Cl.
CPC ................ *H04N 5/04* (2013.01); *H04N 9/31* (2013.01); *H04S 2400/01* (2013.01)

(56) References Cited

U.S. PATENT DOCUMENTS

| 2016/0035331 A1* | 2/2016 | Murakami | G10H 1/32 |
| | | | 84/726 |
| 2016/0112799 A1 | 4/2016 | Uehara | |
| 2017/0125001 A1* | 5/2017 | Ohnishi | G10K 9/13 |
| 2017/0206881 A1* | 7/2017 | Ekuni | G10H 1/045 |
| 2019/0279608 A1* | 9/2019 | Abiko | G10H 3/146 |

FOREIGN PATENT DOCUMENTS

| JP | 2016082575 A | 5/2016 |
| WO | 9106941 A1 | 5/1991 |
| WO | 9730564 A1 | 8/1997 |

OTHER PUBLICATIONS

Written Opinion issued in Intl. Appln. No. PCT/JP2019/019466 dated Jul. 30, 2019.

English translation of Written Opinion issued in Intl. Appln. No. PCT/JP2019/019466 dated Jul. 30, 2019, previously cited on Nov. 16, 2020.

Office Action issued in Japanese Appln. No. 2018-100186 dated Apr. 26, 2022. English machine translation provided.

* cited by examiner

FIG.3

| setting data | timecode |
| | track 1 audio data |
| | track 2 audio data |
| | ⋮ |
| | track n audio data |
| | video data 1 |
| | video data 2 |
| | ⋮ |
| | video data n |
| | lighting data |
| | signal processing parameters |

REPRODUCTION SYSTEM AND REPRODUCTION METHOD

CROSS REFERENCE TO RELATED APPLICATIONS

The present application is a continuation application of International Patent Application No. PCT/JP2019/019466, filed on May 16, 2019, which claims priority to Japanese Patent Application No. 2018-100186, filed on May 25, 2018. The contents of these applications are incorporated herein by reference in their entirety.

BACKGROUND

Technical Field

An embodiment of the present disclosure relates to a reproduction system and a reproduction method for reproducing audio data.

Background Information

Japanese Utility-Model Application Publication No. H6-21097 discloses a configuration for recording sounds of musical instruments played by players via different channels for different musical instruments and recording performance data for a self-playing piano. The self-playing piano gives an automatic performance in accordance with the recorded performance data. The sounds of the other musical instruments are emitted from speakers corresponding to the respective channels. At the same time, a projector reproduces a video of the players.

SUMMARY

A self-playing piano moves keys and other members in the absence of a player. As in this case, when keys and other members of an acoustic instrument are driven physically in the absence of a player, even if a video of a player is reproduced, the audience would not feel as if the player is there and would have a feeling of strangeness. Therefore, in the conventional configuration, the reproducibility of a live performance is poor.

An object of an embodiment of the present disclosure is to provide a reproduction system and a reproduction method that reproduce a live performance with high reproducibility.

A reproduction system includes an output apparatus that outputs multitrack data including a plurality of track-by-track audio data of sounds of (i) musical instruments, (ii) singing voices, or both (i) and (ii), the plurality of track-by-track audio data including audio data of at least an acoustic instrument, a vibrator that vibrates the acoustic instrument in accordance with the audio data of the acoustic instrument included in the plurality of track-by-track audio data included in the multitrack data, and a speaker that outputs the sounds of (i) the musical instruments, (ii) the singing voices, or both (i) and (ii) in accordance with the plurality of track-by-track audio data.

According to an embodiment of the present disclosure, it is possible to cause an acoustic instrument to emit a sound without physically driving handling elements, such as keys and the like, and the reproducibility of a live performance becomes higher than the reproducibility by a conventional method or system.

BRIEF DESCRIPTION OF THE DRAWINGS

FIG. 3 is a schematic diagram showing the configuration of multitrack data.

DETAILED DESCRIPTION

Figure 1:
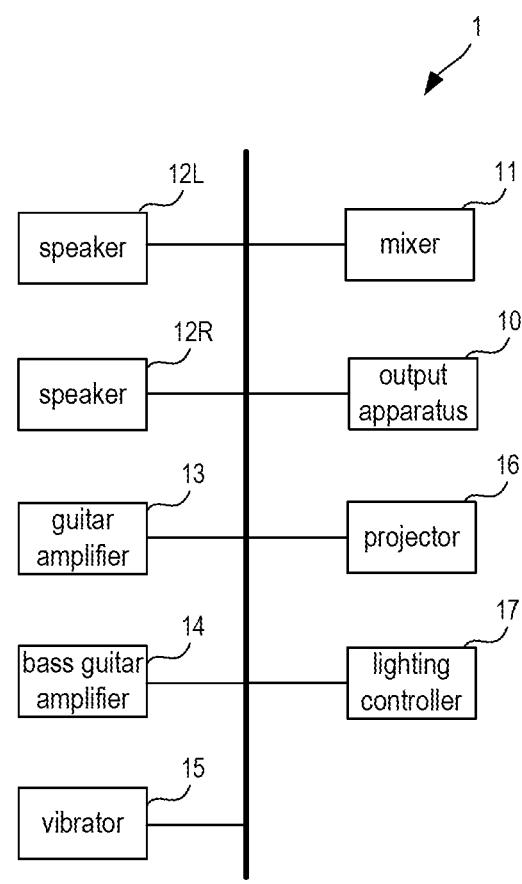
FIG. 1 is a block diagram showing the configuration of a reproduction system 1.

FIG. 1 is a block diagram showing the configuration of a reproduction system 1. The reproduction system 1 includes an output apparatus 10, a mixer 11, a speaker 12L, a speaker 12R, a guitar amplifier 13, a bass guitar amplifier 14, a vibrator 15, a projector 16, and a lighting controller 17.

These devices are interconnected via a network. In the present embodiment, however, the devices are not necessarily interconnected via a network. For example, the devices may be connected to one another via transmission lines, such as USB cables, HDMI (registered tradename), MIDI, etc. Each of the devices does not need to be connected to a network directly. Each of the devices may be connected to the network via an audio signal terminal and an IO device with a network terminal.

Figure 2:
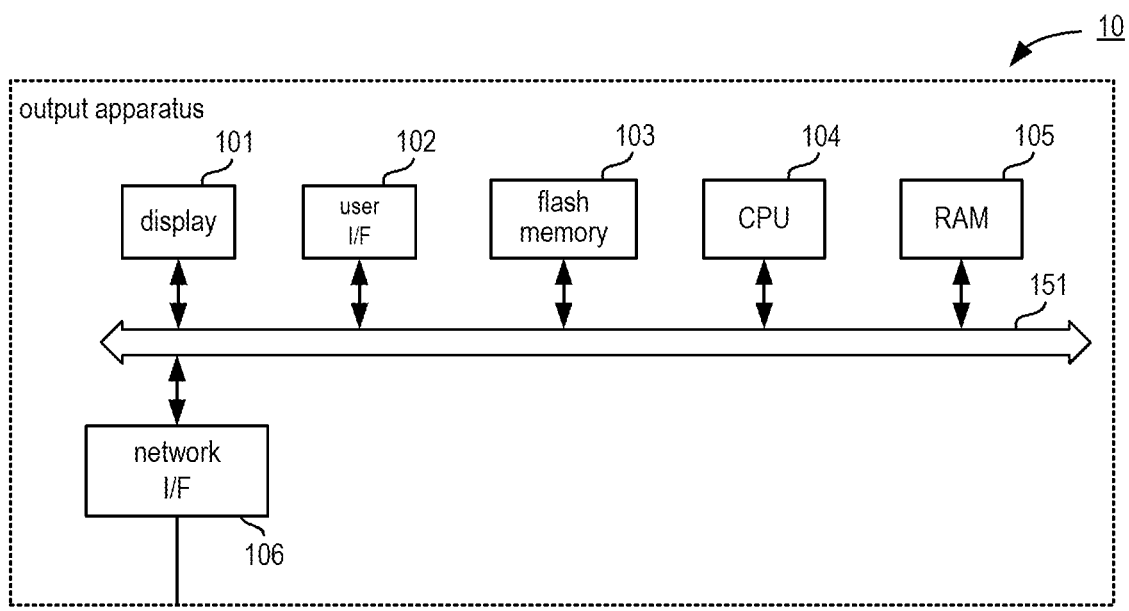
FIG. 2 is a block diagram showing the configuration of an output apparatus 10.

FIG. 2 is a block diagram showing the main components of the output apparatus 10. The output apparatus 10 includes a display 101, a user interface (I/F) 102, a flash memory 103, a CPU 104, a RAM 105, and a network interface (I/F) 106.

The output apparatus 10 is a commonly used information processor, such as a personal computer, a smartphone, a tablet-type computer, or the like. The display 101 is, for example, an LCD (liquid crystal display), a display using an OLED (organic light emitting diode), or the like, and displays various kinds of information. The user I/F 102 is a switch, a keyboard, a mouse, a trackball, a touch panel, or the like, and receives a user's input. When the user I/F 102 is a touch panel, the user I/F 102 and the display 101 form a GUI (graphical user interface).

The CPU 104 reads out a program stored in the flash memory 103 to the RAM 105, and performs a predetermined function. For example, the CPU 104 displays an input picture, which is used for receiving an input from a user, on the display 101, and receives an input, for example, by receiving the user's choice on the screen. In this way, a GUI is achieved. Also, the CPU 104 reads out specified data from the flash memory 103 or an external device in accordance with the details of the input received at the user I/F 102, and decodes the data. The CPU 104 outputs the decoded data to other devices.

The program read out by the CPU 104 is not necessarily stored in the flash memory 103 inside the output apparatus 10 itself. For example, the program may be stored in a storage medium in an external device, such as a server or the like. In this case, the CPU 104 reads out the program from the server to the RAM 105 and executes the program when necessary.

The data to be read out by the CPU 104 are multitrack data including track-by-track audio data of sounds of musical instruments played by players or singing voices of singers. FIG. 3 is a schematic diagram showing the configuration of the multitrack data. The multitrack data contains setting data, a timecode, track-by-track audio data, video data, lighting data, and signal processing parameters.

The setting data are data for the fundamental setting of the mixer. The fundamental setting of the mixer, for example, includes setting of an audio signal sampling frequency, setting of a word clock, patch setting, network setting, and the like.

Figure 4:
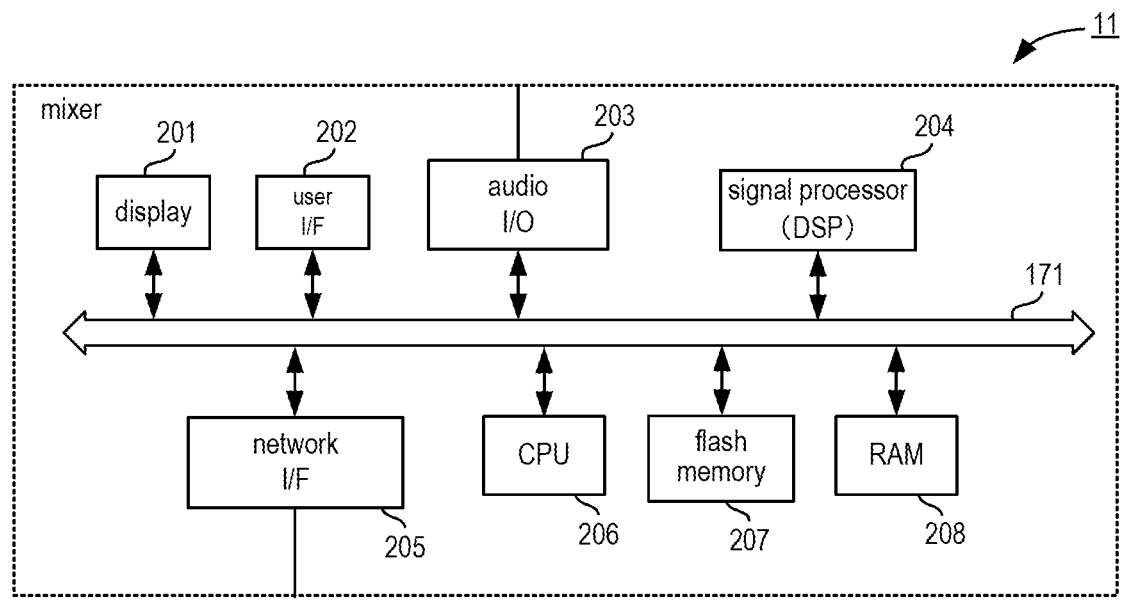
FIG. 4 is a block diagram showing the configuration of a mixer 11.

FIG. 4 is a block diagram showing the configuration of the mixer 11. The mixer 11 is an example of the signal processor according to the present embodiment. The mixer 11 includes a display 201, a user I/F 202, an audio I/O (input/output) 203, a signal processor (DSP) 204, a network I/F 205, a CPU 206, a flash memory 207, and a RAM 208. These elements are interconnected via a bus 171.

The CPU 206 is a controller that controls the operation of the mixer 11. The CPU 206 reads out a specified program stored in the flash memory 207 to the RAM 208 and executes the program, and in this way, the CPU 206 carries out various operations.

Programs to be read out by the CPU 206 are not necessarily stored in the flash memory 207 inside the mixer 11 itself. For example, the programs may be stored in a storage medium in an external device, such as a server or the like. In this case, the CPU 206 reads out a program from the server to the RAM 208 and executes the program when necessary.

The signal processor 204 is a DSP that carries out various kinds of signal processing. The signal processor 204 carries out signal processing, such as mixing, gain adjustment, equalizing, complexing, etc., of audio signals inputted thereto via the audio I/O 203 or the network I/F 205. The signal processor 204 outputs the signal-processed audio signal to other devices, such as the speaker 12L, the speaker 12R, etc., via the I/O 203 or the network I/F 205.

Figure 5:
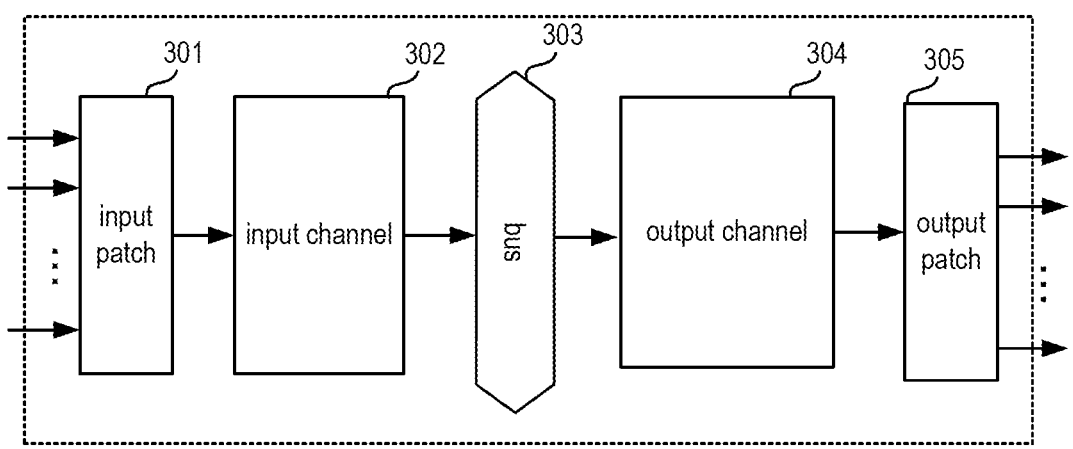
FIG. 5 is a functional block diagram showing signal processing carried out by a signal processor 204 and a CPU 206.

FIG. 5 is a functional block diagram showing the signal processing carried out by the signal processor 204 and the CPU 206. As shown in FIG. 5, the signal processing is functionally carried out by an input patch 301, an input channel 302, a bus 303, an output channel 304, and an output patch 305.

The input patch 301 receives audio signals through a plurality of input ports (for example, analogue input ports or digital input ports) of the audio I/O 203, and the input patch 301 allocates at least one of the plurality of input ports to at least one of a plurality of channels (for example, 16 channels). In this way, the audio signals are allocated to channels of the input channel 302. In this way, the audio signals are supplied to different channels of the input channel 302.

Each channel of the input channel 302 carries out various kinds of signal processing of the audio signal inputted thereto.

Figure 6:
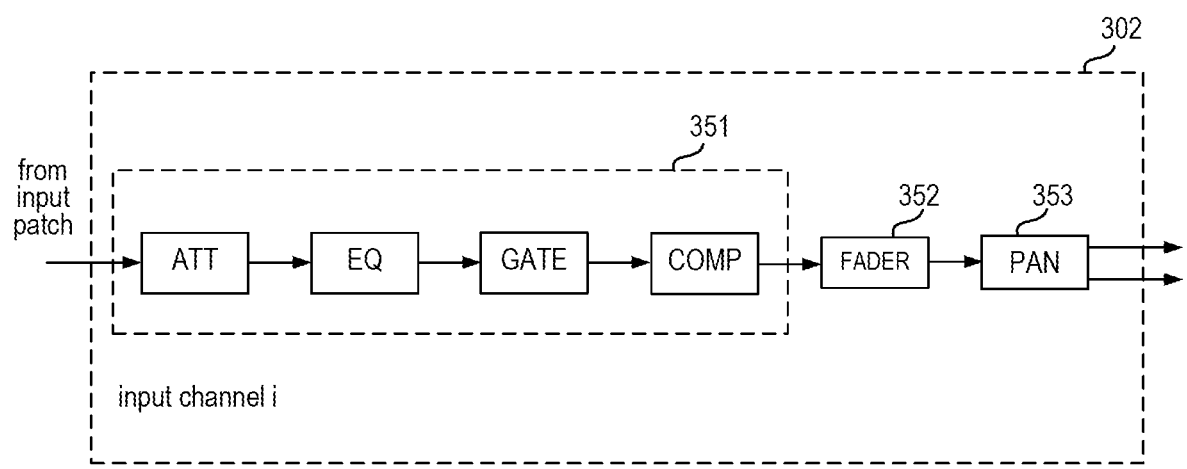
FIG. 6 is a diagram showing processing in an input channel i.

FIG. 6 is a block diagram showing the processing in an input channel i. Each channel of the input channel 302 carries out, in a signal processing block 351, various kinds of processing of the audio signals supplied thereto from the input patch 301. In the example shown in FIG. 6, the signal processing block 351 carries out signal processing of attenuator (ATT), equalizer (EQ), gate (GATE), and compressor (COMP).

The signal-processed audio signals are level-adjusted by a fader 352, and thereafter, sent to the next-stage bus 303 via a pan 353. The pan 353 adjusts the balance between signals sent to a stereo bus (a bus for L channel and a bus for R channel, which are master outputs) of the bus 303.

The channels of the input channel 302 output signal-processed audio signals to the next-stage bus 303.

The bus 303 mixes the audio signals inputted thereto and outputs the resultant audio signals. The bus 303 includes a plurality of buses (for example, an L channel bus, an R channel bus, a SEND bus, an AUX bus, etc.).

The audio signals outputted from the respective buses are subjected to signal processing in the output channel 304. In the output channel 304 also, signal processing such as equalizing, etc. is carried out. Thereafter, the signal-processed audio signals are outputted to the output patch 305. The output patch 305 allocates each output channel to one of a plurality of analogue or digital output ports. Alternatively, the output patch 305 allocates each output channel to a speaker that is connected thereto via a network, such as the speaker 12L, the speaker 12R, or the like. In this way, the audio signals that have been subjected to signal processing, such as mixing and the like, are supplied to the audio I/O 203 or the network I/F 205.

The details of the signal processing described above are usually set by an operator before a live performance. The signal processing parameters that indicate the signal processing details are stored in the flash memory 207 or the RAM 208. The mixer 11 has, in the flash memory 207 or the RAM 208, a scene memory that stores signal processing parameters. The operator can immediately call up the values set in the past only by requesting a call-up of the scene memory. Accordingly, during a live performance, the operator can call up optimum values for each scene that were set, for example, during a rehearsal of a concert. Thus, the details of the signal processing are changeable even during a live performance.

The signal processing details include fundamental setting, such as patch setting, etc., that is not changeable during a live performance and setting that is changeable during a live performance (for example, the kinds and order of effects used, the parameters of the respective effects, etc.). The fundamental setting that is not changeable during a live performance is included in the setting data of the multitrack data shown in FIG. 3. The setting that is changeable during a live performance is included in the signal processing parameters of the multitrack data shown in FIG. 3.

Figure 7:
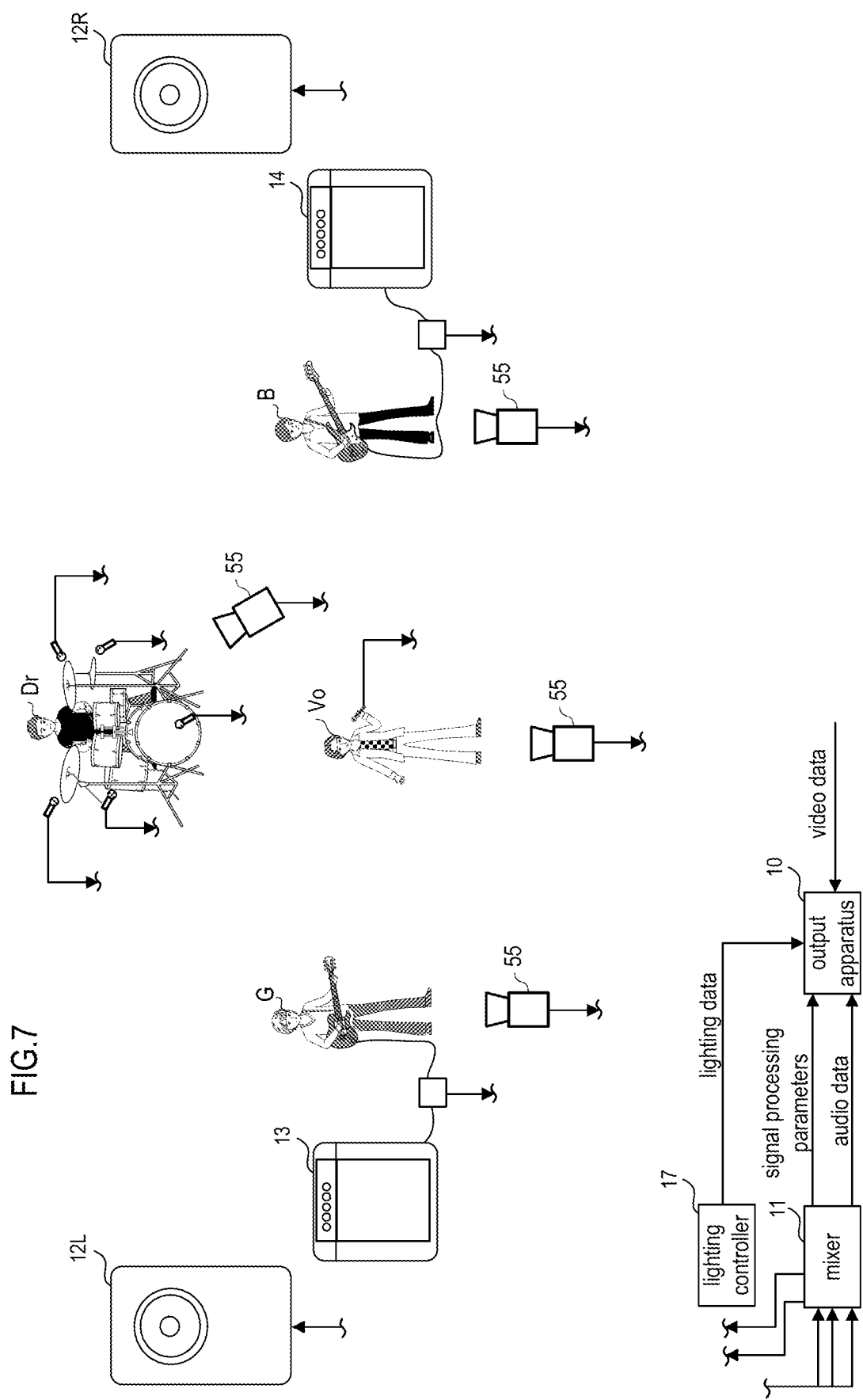
FIG. 7 is a schematic diagram showing a live performance.

FIG. 7 is a schematic diagram showing a live performance. Multitrack data are produced during a live performance. In the live performance, a microphone is set for each player or vocalist. For example, a microphone is set for a vocalist to record his/her singing voice. In this example, for a guitar player G, a bass guitar player B and a drummer Dr, no microphones are set. However, when the guitar player G, the bass guitar player B and the drummer Dr also sing, microphones are set also for these players. In order to record the sound of the drum set, microphones are set for the respective musical instruments (the cymbal, the tom drum, the bass drum, etc.) of the drum set.

The instrumental sounds and singing voice are inputted to the mixer 11 via the microphones. The guitar, the bass guitar and other musical instruments send analogue audio signals or digital audio signals in accordance with the sounds made by the players to the mixer 11. The guitar and the bass guitar also send the analogue or digital audio signals to the guitar amplifier 13 and the bass guitar amplifier 14, respectively. Microphones may be set for the guitar amplifier 13 and the bass guitar amplifier 14 to record the sounds of the guitar and the bass guitar.

The mixer 11 carries out signal processing, such as patching, mixing, effect-making, etc. of the audio signals sent from the microphones or the musical instruments. The mixer 11 outputs the signal-processed audio signals to the speaker 12L and the speaker 12R.

In this way, in the live performance, the singing voice and the instrumental sounds are outputted from the speaker 12L and the speaker 12R. The speakers 12L and 12R are main floor-standing speakers. The sounds outputted from the speakers 12L and 12R reach the audience. Since the drum set is composed of acoustic instruments, the sounds generated from the respective instruments of the drum set reach the audience. Regarding the sounds of the guitar and the bass guitar, the sounds outputted from amplifying speakers for the musical instruments, namely, the guitar amplifier 13 and the bass guitar amplifier 14, etc. also reach the audience.

The mixer 11 sends signal processing parameters that indicate signal processing details to the output apparatus 10. The mixer 11 also sends fundamental setting (setting data) to the output apparatus 10. Further, the mixer 11 sends audio signals to the output apparatus 10 for the respective input channels as track-by-track audio data.

The output apparatus 10 receives lighting data from the lighting controller 17. As shown in FIG. 7, a camera 55 is set for each player or vocalist. The camera 55 sends video data recorded in a predetermined format (for example, MPEG4) to the output apparatus 10. For the present embodiment, it is not essential that a camera 55 is set for each player or vocalist. For example, only one camera 55 may be used to capture video images of all the players and vocalists performing in the live performance.

The lighting controller 17 reads out data recorded in a predetermined format (for example DMX512) for control of lighting equipment for the live performance, and the lighting controller 17 controls lighting. The lighting controller 17 sends the lighting data to the output apparatus 10.

The output apparatus 10 receives the signal parameters and the track-by-track audio data from the mixer 11. The output apparatus 10 receives the video data from the cameras 55. The output apparatus 10 also receives the lighting data from the lighting controller 17. The output apparatus 10 provides these data with timecode and encodes the data into multitrack data as shown in FIG. 3. The timecode is temporal information that indicates the length of time that has elapsed since the start of the live performance with the start time of data recording set as 0. The signal processing parameters may be recorded in the multitrack data as event data only when some change is made to the signal processing parameters, for example, when the scene memory is called up. In this case, the volume of the multitrack data is reduced.

In this way, multitrack data of the live performance is produced.

Figure 8:
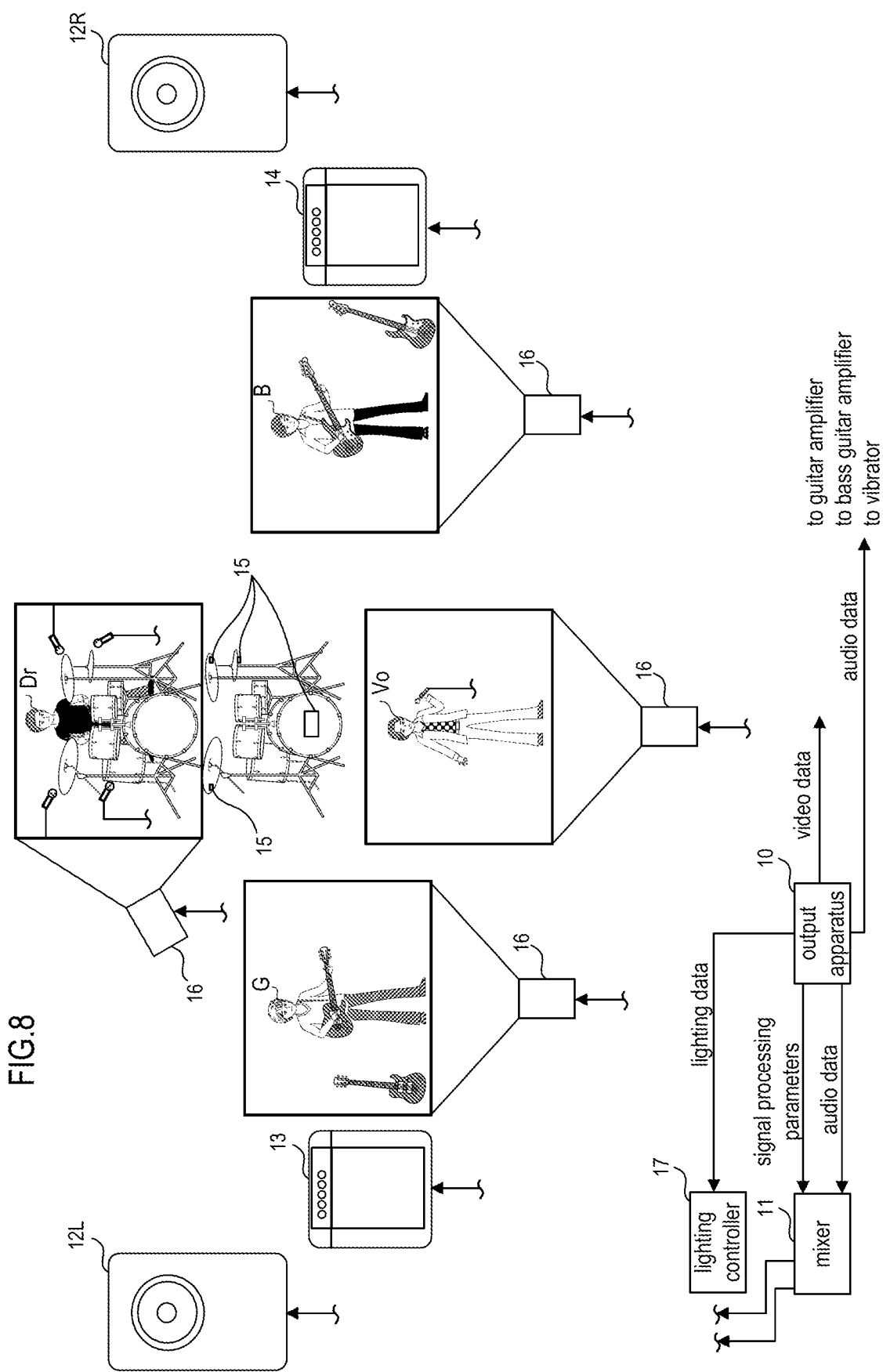
FIG. 8 is a schematic diagram showing reproduction of the live performance.

FIG. 8 is a schematic diagram showing reproduction of the live performance. In a venue for reproduction of the live performance, screens are set at places corresponding to the positions of the players and vocalist. The output apparatus 10 decodes the multitrack data and extracts the setting data, the timecode, and the video data. The output apparatus 10 outputs the setting data to the projector 16. The projector 16 carries out fundamental setting in accordance with the setting data. The output apparatus 10 outputs the video data to the projector 16 in synchronization with the timecode. Then, the projector 16 projects videos of the players and vocalists on the screens.

In the example shown in FIG. 8, transparent screens are used. Real musical instruments are set in front of, behind or near the transparent screens. For example, a drum set is set near the screen on which the video of the drummer is to be projected. A guitar and a guitar amplifier 13 are set near the screen on which the video of the guitar player is to be projected. A bass guitar and a bass guitar amplifier 14 are set near the screen on which the video of the bass guitar player is to be projected. In this way, near a musical instrument or an amplifying speaker for the musical instrument, the video of the player is projected, and therefore, the audience can watch the live performance reproduced with high reproducibility.

Projection of a video on a screen is not an element for the present embodiment. For example, the videos of the players and vocalist may be displayed on liquid crystal displays or any other displays. The screens may be transparent or opaque. However, the use of transparent screens makes the audience perceive real musical instruments superposed on the videos of the players, which heightens the reproducibility of the live performance. The video of the drummer is projected on the screen located behind the screen for the vocalist, and therefore, the audience can feel like they are in a real live performance venue.

The output apparatus 10 decodes the multitrack data and extracts the setting data, the timecode, and the lighting data. The output apparatus 10 outputs the setting data to the lighting controller 17. The lighting controller 17 carries out fundamental setting in accordance with the setting data. The output apparatus 10 outputs the lighting data to the lighting controller 17 in synchronization with the timecode. Then, the lighting in the live performance is reproduced.

The output apparatus 10 decodes the multitrack data and extracts the setting data, the timecode, the signal processing parameters, and the track-by-track audio data. The output apparatus 10 outputs the setting data to the mixer 11. The mixer 11 carries out fundamental setting in accordance with the setting data. Thereby, patch setting, input channel setting, output channel setting, etc. are completed. When an operator starts an operation to reproduce the live performance, the output apparatus 10 outputs the signal processing parameters and the track-by-track audio data to the mixer 11 in synchronization with the timecode. The signal processing parameters may be outputted at all times or alternatively may be outputted only when some change is made to the details of the signal processing. The audio data may be converted into digital audio signals in the output apparatus 10 or alternatively may be converted into digital audio signals by the DSP in the mixer 11.

The mixer 11 receives the track-by-track audio data. The mixer 11 processes the track-by-track audio data in accordance with the set signal processing details. The mixer 11 sends the signal-processed audio data to the speaker 12L and the speaker 12R as audio signals. Accordingly, the singing voice and the sounds of musical instruments are outputted from the speakers 12L and 12R as in the live performance. The sounds outputted from the speakers 12L and 12R reach the audience.

In the example of a live performance venue shown in FIG. 7 and the example of a reproduction venue shown in FIG. 8, the same equipment is set in both the live performance venue and the reproduction venue. However, the equipment in the live performance venue and the equipment in the reproduction venue are not necessarily the same. Therefore, the setting data and the signal processing parameters are adjustable depending on the equipment in the reproduction venue. After receiving the setting data and the signal processing parameters from the output apparatus 10, the operator of the mixer 11 can make some changes to the setting data and the signal processing parameters depending on the equipment in the reproduction venue. Alternatively, the operator adjusts the setting data and the signal processing parameters by using the user I/F 102 of the output apparatus 10, and thereafter, the signal processing parameters are outputted from the output apparatus 10 to the mixer 11.

For example, when only one speaker is set in the reproduction venue, the operator at the reproduction venue makes changes to the output channel and the patch setting. For example, the operator makes settings such that the signal processing at the output side will be carried out to mix down two channels into one channel.

Also, for example, what frequency is prone to howling depends on the acoustic transmission characteristics in the entire venue. Therefore, the operator changes the setting of the equalizer to prevent howling from occurring in the reproduction venue.

The mixer 11 may automatically adjust the signal parameters depending on the equipment in each reproduction venue. For example, the mixer 11 makes the speakers in the reproduction venue emit test sounds, and obtains the transmission characteristics from the speakers to the respective microphones in the reproduction venue. The mixer 11 changes the equalizer in accordance with the obtained transmission characteristics. For example, the mixer 11 calculates a frequency response characteristic from the obtained transmission characteristics, and a notch filter is set for a frequency region where the frequency response characteristic has a steep peak. Further, the mixer 11 can dynamically change the setting of the notch filter by using a learning algorism, such as an LMS (learning measurement system) or the like. In this way, the mixer 11 can automatically adjust the signal processing parameters depending on the equipment in the venue.

The output apparatus 10 reads out the audio data in a track corresponding to audio signals outputted from each musical instrument. In the example shown in FIG. 8, the output apparatus 10 reads out audio data of audio signals outputted from the guitar and audio data of audio signals outputted from the bass guitar. The output apparatus 10 extracts these audio signals and outputs the audio signals to the guitar amplifier 13 and the bass guitar amplifier 14. Accordingly, regarding the sounds of a guitar and a bass guitar, the sounds outputted from the guitar amplifier 13 and the bass guitar amplifier 14 reach the audience as well as the sounds outputted from the main speakers 12L and 12R. Thus, the reproducibility of the live performance is noticeably improved.

Also, the output apparatus 10 reads out audio data for a microphone set for an acoustic instrument. In the example shown in FIG. 8, the output apparatus 10 reads out audio data for the microphone set for each instrument of the drum set. The output apparatus 10 outputs the audio data to the vibrator 15.

The vibrator 15 is an example of a vibrator according to the present embodiment. The vibrator 15 vibrates an instrument of the drum set in accordance with the audio data inputted thereto from the output apparatus 10.

Figure 9:
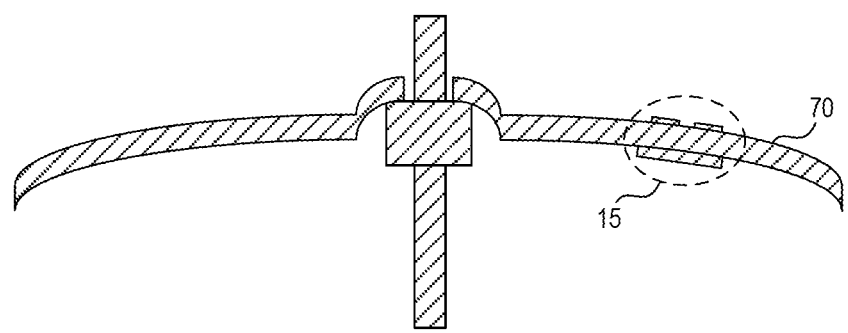
FIG. 9 is a sectional view of a cymbal 70 of a drum set.
Figure 10:
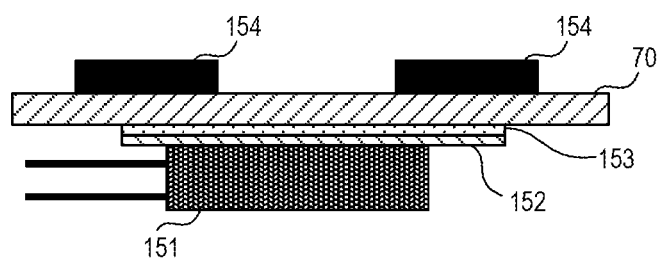
FIG. 10 is a sectional view showing details of a vibrator 15.
Figure 11:
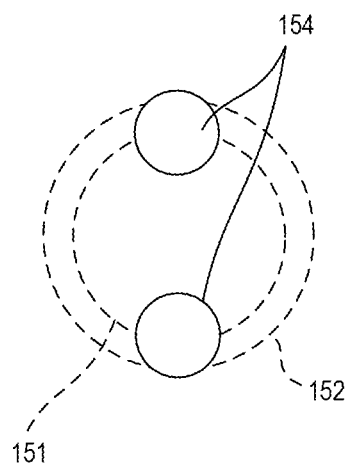
FIG. 11 is a partially transparent plan view of the vibrator 15.

FIG. 9 is a sectional view of a cymbal 70 of the drum set. The vibrator 15 is fixed to the cymbal 70. FIG. 10 is a sectional view showing details of the vibrator 15. FIG. 11 is a partially transparent plan view of the vibrator 15.

The vibrator 15 includes an actuator 151, a sheet metal 152, a cushion 153, and a magnet 154. The actuator 151 is shaped like a disk. The actuator 151 receives an audio signal. The actuator 151 drives a voice coil (not shown) in accordance with the audio signal inputted thereto and vibrates in a height direction (normal direction).

The upper surface of the actuator 151 is bonded to the flat sheet metal 152. The sheet metal 152 is circular in a planar view. In a planar view, the sheet metal 152 is larger than the actuator 151 in area.

Since the sheet metal 152 is bonded to the upper surface of the actuator 151, the sheet metal 152 vibrates with the vibration of the actuator 151. The sheet metal 152 is attached to the lower surface of the cymbal 70 via the cushion 153. The cushion 153 is, for example, made of an adhesive material. The cushion 153 functions to fill the space between the curved lower surface of the cymbal 70 and the flat metal sheet 152. This suppresses noise that is generated at the contact point between the metal sheet 152 and the cymbal 70 during the vibration. The sheet metal 152 is a magnetic body. Therefore, by the magnetic force of the magnet 154 arranged on the upper surface of the cymbal 70, the cymbal 70 is pinched between the sheet metal 152 and the magnet 154.

As shown in the plan view of FIG. 11, two magnets 154 are used in this example. The voice coil is disposed in the center of the actuator 151 in a planar view. The voice coil is actuated by a change in magnetic field caused by an audio signal, and transmits its vibration to the cymbal 70. If the magnets 154 are positioned close to the actuator 151, the magnetic field of the magnets 154 may affect the magnetic field of the voice coil. Therefore, it is preferred that the magnets 154 are disposed away from the voice coil.

Thus, the vibrator preferably has the following features:
(1) the vibrator includes an actuator that vibrates in accordance with an audio signal of an acoustic instrument;
(2) the vibrator includes an attacher that attaches the actuator to a musical instrument by magnetic force; and
(3) the attacher is disposed at a location corresponding to a peripheral portion of the actuator.

Figure 12:
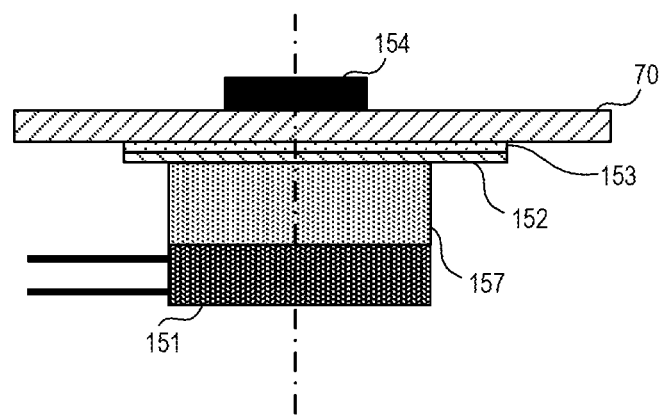
FIG. 12 is a sectional view showing details of a modification of the vibrator 15.

Alternatively, the attacher (magnet 154) may be disposed on the axis of the actuator as shown in FIG. 12. In this case, an insulator 157, such as resin or the like, is disposed between the actuator 151 and the sheet metal 152. The insulator 157 functions to keep a distance between the actuator 151 and the metal sheet 152.

In other words, the vibrator may have the following features:
(1) the vibrator includes an actuator that vibrates in accordance with an audio signal of an acoustic instrument;
(2) the vibrator includes an attacher that attaches the actuator to a musical instrument by magnetic force;
(3) the attacher includes a magnet and a magnetic body; and
(4) an insulating layer is disposed between the actuator and the magnetic body.

When a vibrator with the features is attached to a cymbal or any other acoustic instrument, the vibrator can vibrate the acoustic instrument without being affected by the magnetic force of the attacher. Since the vibrator is attached to the acoustic instrument by magnetic force, it is easy to attach and detach the vibrator to and from the acoustic instrument. Therefore, the acoustic instrument can be used in a live performance after the vibrator 15 is detached therefrom.

In the above-described embodiment, the case in which the vibrator 15 vibrates the cymbal 70 has been described as an example. However, it is possible to vibrate all other instruments of the drum set in the same structure and by the same function. The structure of the vibrator 15 is not necessarily as illustrated in FIG. 11 or 12. For example, the vibrator 15 may have a structure in which the actuator 151 can be pressed from one direction against an acoustic instrument. For example, the vibrator 151 may include a plurality of clamps attached to the rim of a tom drum, and a sheet metal connecting the plurality of clamps to each other, and the actuator 151 may be attached to the sheet metal and pressed against the head.

The vibrator 15 can vibrate not only the drum set but also any other acoustic instrument and cause the acoustic instrument to emit a sound. For example, the vibrator 15 may be attached to the soundboard of a piano and may vibrate the soundboard to generate a sound.

In the above-described structure, regarding a sound of an acoustic instrument, the sound emitted from the acoustic instrument reaches the audience as well as the sound emitted from the main speakers 12L and 12R. Therefore, the reproducibility of the live performance is noticeably improved.

Figure 13:
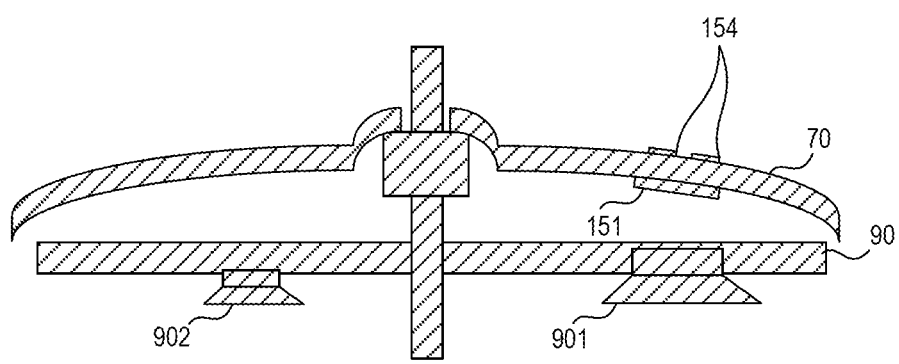
FIG. 13 is a sectional view showing an application example of the vibrator 15.

FIG. 13 is a sectional view showing an application example of the vibrator 15. In the application example, the structure for attachment of the vibrator 15 to the cymbal 70 is the same as that shown in FIGS. 9, 10 and 11, and the description is omitted.

The vibrator 15 further includes a baffle 90, and auxiliary speakers 901 and 902. The baffle 90 is shaped like a disk. In a planar view, the baffle 90 is the same as or a little smaller than the cymbal 70 in area. Though not shown, the baffle 90 has circular holes or hollows. In the circular holes or hollows, the auxiliary speakers 901 and 902 are fitted.

The auxiliary speakers 901 and 902 are set in such a manner as to emit sounds from the cymbal 70 to a downward direction. However, the directions in which the auxiliary speakers 901 and 902 emit sounds may be an upward direction from the cymbal 70.

The auxiliary speaker 901 is a low-frequency (or full-range) speaker. The auxiliary speaker 901 outputs low-frequency sounds that are included in the sounds emitted from the cymbal 70 in the live performance and are in a too low frequency range to be reproduced by the actuator 151 (for example, sounds of 500 Hz or lower). The auxiliary speaker 902 is a high-frequency speaker. The auxiliary speaker 902 outputs high-frequency sounds that are included in the sounds emitted from the cymbal 70 in the live performance and are in a too high frequency range to be reproduced by the actuator 151 (for example, sounds of 4 kHz or higher).

The vibrator 15 separates the audio signal inputted thereto from the mixer 11 into a plurality of audio signals and applies low-pass filtering to one of the audio signals. Alternatively, the vibrator 15 further receives an audio signal that was already low-pass filtered in the mixer 11. Also, the vibrator 15 separates the audio signal inputted thereto from the mixer 11 into a plurality of audio signals and applies high-pass filtering to one of the audio signals. Alternatively, the vibrator 15 further receives an audio signal that was already high-pass-filtered in the mixer 11.

The vibrator 15 inputs the low-pass-filtered audio signal to the auxiliary speaker 901. Also, the vibrator 15 inputs the high-pass-filtered audio signal to the auxiliary speaker 902.

In the structure, the vibrator 15 supplements high-frequency sounds and low-frequency sounds by using speakers, and the sounds in the live performance can be reproduced with higher reproducibility. The baffle 90, and the auxiliary speakers 901 and 902 are disposed very near the cymbal 70. Therefore, even when a sound of the cymbal 70 is outputted from the speakers, the audience feels as if the cymbal 70 is ringing.

Auxiliary speakers may be set for other acoustic instruments as well as the cymbal 70 to supplement high-frequency sounds or low-frequency sounds, and thereby, the sounds in the live performance can be reproduced with higher reproducibility. In the example described above, the auxiliary speakers are disposed very near the cymbal 70 by being attached to the baffle 90. However, even when the auxiliary speakers are disposed near (but not so near as in the above-described example) the drum set, the audience feels as if the cymbal 70 is ringing.

Figure 14:
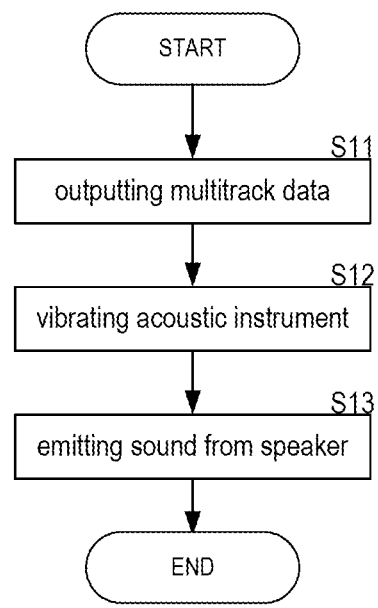
FIG. 14 is a flowchart showing operations of the reproduction system.

FIG. 14 is a flowchart showing operations of the reproduction system according to the present embodiment. The reproduction system includes an output step (S11) for outputting multitrack data, a vibration step (S12) for vibrating an acoustic instrument, and a sound emission step (S13) for emitting a sound from a speaker. The audio data is synchronized with a timecode, and therefore, the vibration step (S12) for vibrating an acoustic instrument and the sound emission step (S13) for emitting a sound from a speaker are executed at the same time.

Figure 15:
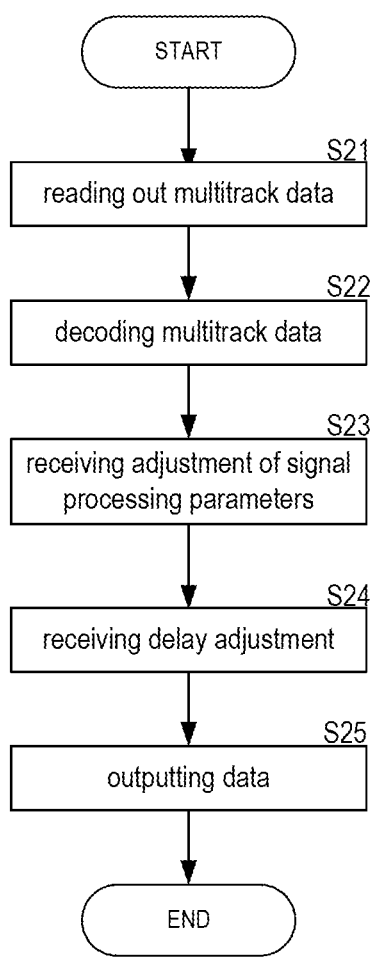
FIG. 15 is a flowchart showing details of an output step.

The output apparatus 10 outputs multitrack data including track-by-track audio data of musical instruments played by players or singing voices of singers. FIG. 15 is a flowchart showing details of the operation at the output step. The process shown in FIG. 15 is carried out by the CPU 104. The CPU 104 reads out a program stored in the flash memory 103 to the RAM 105 and executes the program, and thereby, the CPU 104 carries out the process shown in FIG. 15.

The CPU 104 reads out multitrack data from the flash memory 103 or any other storage device, such as a server or the like (S21). The CPU 104 decodes the multitrack data and extracts fundamental data, a timecode, audio data, video data, lighting data and signal processing parameters (S22).

Thereafter, the CPU 104, for example, displays a confirmation picture on the display 101 and receives adjustment of the signal parameters (S23). As mentioned above, the equipment in the live performance venue and the equipment in the reproduction venue are not always the same. Therefore, the operator makes adjustment to the fundamental data and the signal processing parameters by using the user I/F 102 of the output apparatus 10.

Figure 16:
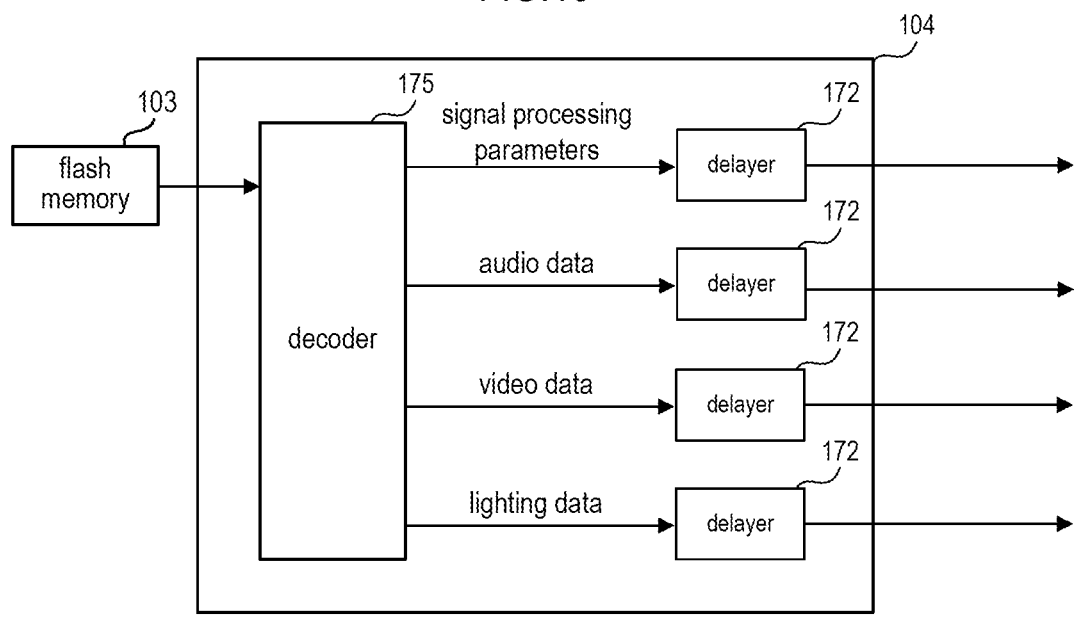
FIG. 16 is a block diagram showing the functional configuration of a CPU 104 for reception of delay adjustment at the output apparatus 10.

Next, the CPU 104, for example, displays a confirmation picture on the display 101 and receives delay adjustment (S24). FIG. 16 is a block diagram showing the functional configuration of the CPU 104 for the reception of delay adjustment at the output apparatus 10.

Functionally, the CPU 104 includes a plurality of delayers 172, and a decoder 175. As mentioned above in connection with step S22, the decoder 175 decodes the multitrack data and extracts fundamental data, a timecode, audio data, video data, lighting data, and signal processing parameters. Also, the decoder 175 synchronizes the audio data, the video data, the lighting data and the signal processing parameters with one another by using the timecode.

The plurality of delayers 172 receive the audio data, the video data, the lighting data and the signal processing parameters, respectively, which are synchronized with one another. The plurality of delayers 172 provide delays to the timecode, the audio data, the video data, the lighting data and the signal processing parameters. The amounts of delays to be provided by the respective delayers 172 are manually set by the operator.

As mentioned above, the equipment in the live performance venue and the equipment in the reproduction venue are not always the same. Also, there may be differences in processing capability among the devices, and there may be a difference in network capability between the venues. Therefore, even though the audio data, the video data, the lighting data and the signal parameters are synchronized with one another, there may be great lags of sound, video and light reaching the audience depending on the reproduction venue. The operator adjusts the amounts of delays of the audio data, the video data, the lighting data and the signal processing parameters to adjust the timing of the arrivals of sound, video and light at the audience.

After completion of the adjustment, the operator requests an output of these data by using the user I/F 102 to reproduce the live performance. The CPU 104 synchronizes the audio data, the video data, the lighting data and signal processing parameters with one another, and outputs these data to the corresponding devices (S25).

It should be understood that the present embodiment has been described as an example and that the description is not limiting. The scope of the present disclosure is not limited to the embodiment above and is determined by the claims. Further, the scope of the disclosure shall be deemed to include equivalents of the scope of the claims and all possible modifications within the scope. For example, the mixer 11 may include the function of the output apparatus 10. The output apparatus 10 may be achieved by combination of a plurality of devices.

What is claimed is:

1. A reproduction system comprising:
   an output apparatus that outputs multitrack data including a plurality of track-by-track audio data of sounds of (i) musical instruments, (ii) singing voices, or both (i) and (ii), the plurality of track-by-track audio data including audio data of at least an acoustic instrument;
   a vibrator that vibrates the acoustic instrument in accordance with the audio data of the acoustic instrument included in the plurality of track-by-track audio data included in the multitrack data; and
   a speaker that outputs the sounds of (i) the musical instruments, (ii) the singing voices, or both (i) and (ii) in accordance with the plurality of track-by-track audio data,
   wherein the vibrator includes:
   an actuator that vibrates in accordance with the audio data of the acoustic instrument; and
   an attacher that attaches the actuator to the acoustic instrument by magnetic force, and
   wherein the attacher is disposed at a location corresponding to a peripheral portion of the actuator.

2. The reproduction system according to claim 1, wherein the speaker includes a main speaker and an amplifying speaker, the amplifying speaker being an amplifier for a musical instrument of the musical instruments.

3. The reproduction system according to claim 1, wherein:
   the multitrack data further includes a signal processing parameter; and
   the reproduction system further comprises a signal processor that processes the plurality of track-by-track audio data in accordance with the signal processing parameter and outputs the signal-processed audio data to the vibrator and the speaker.

4. The reproduction system according to claim 1, further comprising an auxiliary speaker that outputs a sound of the acoustic instrument in accordance with the audio data of the acoustic instrument.

5. The reproduction system according to claim 4, wherein the auxiliary speaker includes a high-frequency speaker that outputs a sound of the acoustic instrument in a first frequency range that is higher than a frequency range of the sound of the acoustic instrument reproducible by using the vibrator to vibrate the acoustic instrument, and a low-frequency speaker that outputs a sound of the acoustic instrument in a second frequency range that is lower than the frequency range of the sound of the acoustic instrument reproducible by using the vibrator to vibrate the acoustic instrument.

6. The reproduction system according to claim 1, wherein the multitrack data includes temporal information.

7. The reproduction system according to claim 1, wherein the multitrack data includes video data of (iii) players playing the musical instruments, (iv) singers singing the singing voices, or both (iii) and (iv).

8. The reproduction system according to claim 1, further comprising a delayer that provides delays to the plurality of track-by-track audio data.

9. The reproduction system according to claim 1, wherein:
   the attacher includes a magnet and a magnetic body; and
   an insulating layer is disposed between the actuator and the magnetic body.

10. A reproduction method comprising:
    receiving multitrack data including a plurality of track-by-track audio data of sounds of (i) musical instruments, (ii) singing voices, or both (i) and (ii), the plurality of track-by-track audio data including audio data of at least an acoustic instrument;
    vibrating the acoustic instrument and causing the acoustic instrument to emit a sound in accordance with the audio data of the acoustic instrument included in the plurality of track-by-track audio data included in the multitrack data; and
    outputting the sounds of (i) the musical instruments, (ii) the singing voices, or both (i) and (ii) in accordance with the plurality of track-by-track audio data,
    wherein the acoustic instrument is vibrated by using an actuator that vibrates in accordance with the audio data of the acoustic instrument, the actuator being attached to the acoustic instrument by an attacher that attaches the actuator to the acoustic instrument by magnetic force, and
    wherein the attacher is disposed at a location corresponding to a peripheral portion of the actuator.

11. The reproduction method according to claim 10, wherein the sounds of the musical instruments are outputted from a speaker for the musical instruments.

12. The reproduction method according to claim 10, wherein:
    the multitrack data further includes a signal processing parameter; and
    the reproduction method further comprising:
    processing the plurality of track-by-track audio data in accordance with the signal processing parameter, wherein the acoustic instrument is vibrated and caused to emit the sound in accordance with the signal-processed audio data, and wherein the sounds of (i) the musical instruments, (ii) the singing voices, or both (i) and (ii) are output in accordance with the signal-processed audio data.

13. The reproduction method according to claim 10, further comprising outputting the sound of the acoustic instrument from an auxiliary speaker in accordance with the audio data of the acoustic instrument.

14. The reproduction method according to claim 10, wherein the auxiliary speaker includes a high-frequency speaker that outputs a sound of the acoustic instrument in a first frequency range that is higher than a frequency range of the sound of the acoustic instrument reproducible by vibrating the acoustic instrument, and a low-frequency speaker that outputs a sound of the acoustic instrument in a second frequency range that is lower than the frequency range of the sound of the acoustic instrument reproducible by vibrating the acoustic instrument.

15. The reproduction method according to claim 10, wherein the multitrack data includes temporal information.

16. The reproduction method according to claim 10, wherein the multitrack data includes video data of (iii) players playing the musical instruments, (iv) singers singing the singing voices, or both (iii) and (iv).

17. The reproduction method according to claim 10, further comprising providing delays to the plurality of track-by-track audio data.

18. The reproduction method according to claim 10, wherein:

the attacher includes a magnet and a magnetic body; and an insulating layer is disposed between the actuator and the magnetic body.

* * * * *